G. B. DAVIS.
HOT AIR FURNACE.

No. 67,732.

United States Patent Office.

G. B. DAVIS, OF CHICAGO, ILLINOIS, ASSIGNOR TO M. A. THAYER AND W. H. BOOMER, OF SAME PLACE.

Letters Patent No. 67,782, dated August 13, 1867.

HOT-AIR FURNACE.

The Schedule referred to in these Letters Patent and making part of the same.

TO ALL WHOM IT MAY CONCERN:

Be it known that I, G. B. DAVIS, of the city of Chicago, in the county of Cook, and State of Illinois, have invented new and useful improvements in "Hot-Air Furnaces;" and I do hereby declare that the following is a full and exact description thereof, reference being had to the accompanying drawings, making part of this specification, in which—

Figure 1:
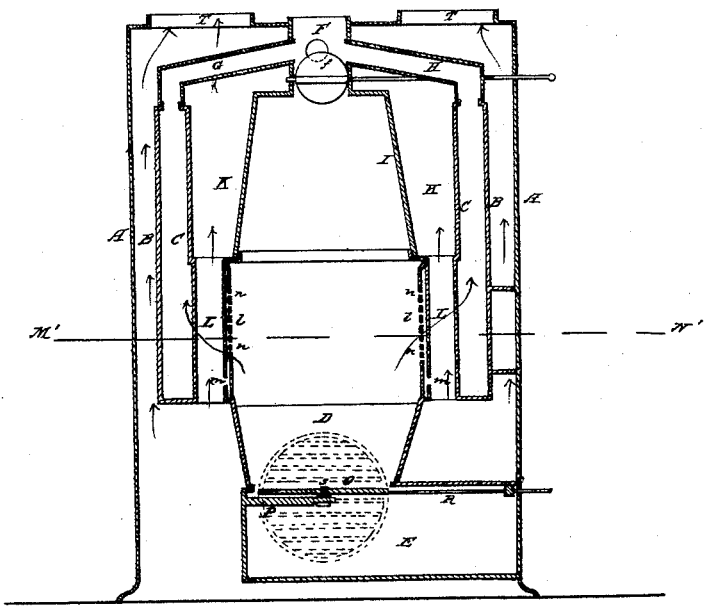
Figure 1 represents vertical section of the furnace along the line M N.
Figure 2:
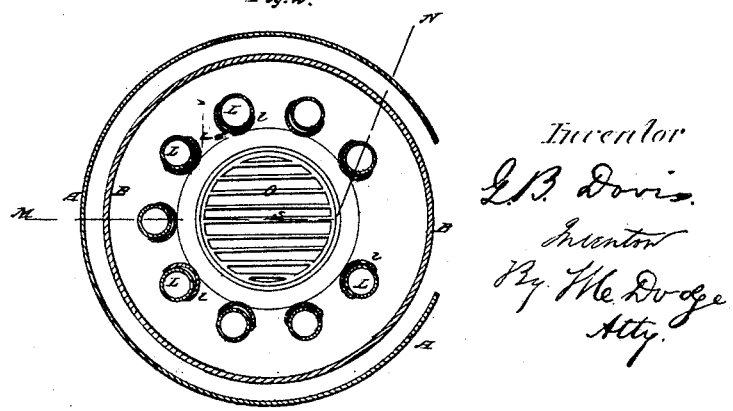
Figure 2 represents horizontal section of the furnace along the line M' N'.

The nature of my invention consists, first, in providing the hot-air furnace with an extra heating surface; second, in protecting the air-tubes with shields against the destructive action of heat; and third, in so arranging the grate as to have it shaking and dumping at the same time.

To enable others skilled in the art to make and use my invention, I will proceed to describe its construction and operation.

A is the outside jacket; B is the outside drum, and C the inside drum of the furnace. D is the fire-kettle, and E the ash-pit. F, the direct smoke-flue, which, when shut with a damper, $f$, the smoke passing between the tubes L L, ascends through the flues G and H. There is a separate inner drum, I, of the shape of a truncated cone, which, with the inside drum C of the furnace, makes an air-chamber, K, forming at the same time an additional heating surface. The air-tubes L L are made of wrought iron, and covered on the side turned towards the fire with shields $l$ $l$ made of cast iron, which shields protect the tubes from effects of heat to a great extent, and thereby preserve them for longer time. The tube L having an opening, $m$, the air goes through it, fills the space between the tube and the shield, and escaping through the minute openings $n$ $n$ of the shield, makes the furnace a gas-burner. The shields are riveted to the tubes. The round grate O has a swivel-loop, S, attached to its centre bar, by means of which it sets on the rounded end of the grate-bar P, and has, consequently, two motions, horizontal and vertical, so that by means of a rod, R, it may be shaken or dumped as will. T T are the openings for hot-air pipes leading to registers through the building.

Having thus fully described my furnace, what I claim as my invention, and desire to secure by Letters Patent, is—

1. The round grate O, in combination with the grate-bar P and swivel-loop S, all arranged and operating as and for the purpose set forth.

2. The air-tubes L L, in combination with shields $l$ $l$, arranged and constructed substantially as herein described and for the purpose specified.

3. The combination of the air-chamber K with the shielded air-tubes L L, substantially as set forth.

G. B. DAVIS.

Witnesses:
 JAS. R. HAYDEN,
 J. B. TURCHIN.